(12) United States Patent
Logan et al.

(10) Patent No.: US 7,083,728 B2
(45) Date of Patent: Aug. 1, 2006

(54) METHOD FOR TREATING SLUDGE USING RECYCLE

(75) Inventors: Terry J. Logan, Hilton Head Island, SC (US); Michael G. Nicholson, Holland, OH (US); Neil Webster, Pewee Valley, KY (US)

(73) Assignee: N-Viro International Corporation, Toledo, OH (US)

( * ) Notice: Subject to any disclaimer, the term of this patent is extended or adjusted under 35 U.S.C. 154(b) by 303 days.

(21) Appl. No.: 10/669,462

(22) Filed: Sep. 25, 2003

(65) Prior Publication Data

US 2005/0067348 A1    Mar. 31, 2005

(51) Int. Cl.
*C02F 3/00* (2006.01)

(52) U.S. Cl. ...................................... 210/609; 210/739
(58) Field of Classification Search ................ 210/609, 210/623, 624, 625, 626, 627, 628, 739
See application file for complete search history.

(56) References Cited

U.S. PATENT DOCUMENTS 5,087,378 A * 2/1992 Kovacs ........................ 210/742

\* cited by examiner

*Primary Examiner*—Chester T. Barry
(74) *Attorney, Agent, or Firm*—Kenyon & Kenyon LLP

(57) ABSTRACT

A method and system for treating at least bioorganic, organic, wastewater, and sewage sludge using recycle. The method of producing a treated sludge product comprises the following steps: (a) forming a sludge mixture by mixing untreated sludge with at least one alkaline material in an amount sufficient to raise pH of the sludge mixture to a level of at least about 12 and to increase percent solids in the sludge mixture to at least about 40% by weight; (b) forming a dried sludge mixture by drying the sludge mixture from step (a) in a direct or indirect dryer thereby increasing the percent solids thereof to at least about 50% by weight; (c) recycling a portion of the dried sludge mixture from step (b) to step (a); and (d) pasteurizing the dried sludge mixture from step (b) at a temperature at or above about 52° C. to form a treated sludge product. Exemplary applications for the treated sludge product include an agricultural liming agent, a soil conditioner, a fertilizer, a topsoil blend ingredient, and a fuel.

9 Claims, 1 Drawing Sheet

METHOD FOR TREATING SLUDGE USING RECYCLE

FIELD OF INVENTION

This invention relates to a method of treating bioorganic, organic, wastewater, and/or sewage sludge to stabilize the sludge so that it can be safely utilized as a soil amendment or fertilizer in agriculture or as a component of synthetic soil for general usage.

BACKGROUND OF THE INVENTION

The United States Environmental Protection Agency (EPA) has promulgated rules governing wastewater or sewage sludge quality required for the treated sludge to be land filled or land applied as soil additions or as fertilizer to food crops.

Under 40 CFR 503, there are two sets of sludge pathogen reduction requirements, Class A and Class B. Class A sludge requirements are the most stringent in terms of the pathogen levels required by the EPA. To qualify as Class A, the sludge end product must achieve certain microbial content that is demonstrated by six alternative requirements. Basically, the fecal coliform density in the treated sludge must be less than 1 thousand most probable number per gram total solids sludge on a dry weight basis or the density of *Salmonella*, sp. bacteria in the treated sludge must be less than 3 most probable number per 4 grams of total solids sludge on a dry weight basis. In addition, certain sludge temperature, pH, and subcomponent density levels must be met under alternative requirements.

Class B sludge requirements are less stringent, where the sludge end product must achieve certain microbial content that is demonstrated by three alternative requirements. Here, fecal coliform density in the treated sludge must be less than 2 million most probable number per gram total solids sludge on a dry weight basis or less than 2 million colony forming units per gram total solids sludge on a dry weight basis.

Several processes for treating sludge have been developed. In U.S. Pat. Nos. 4,781,842 and 4,902,431, there are disclosed processes wherein wastewater sludge containing odor, animal viruses, pathogenic bacteria, and parasites is treated to provide a fertilizer for agricultural lands which can be applied directly to the lands. The treatment process consists essentially of the following steps: mixing the sludge with at least one alkaline material sufficient to raise the pH of the mixture to 12 and above for at least one day, and drying the mixture to produce a granular material sufficient to reduce significantly offensive odor of the sludge to a level that is tolerable, to reduce the animal viruses, pathogenic bacteria, and parasites in the sludge to EPA required levels, to reduce vector attraction to said sludge, and to prevent significant regrowth of the pathogenic microorganisms.

Typically, the alkaline material mixed with the sludge comprises such materials as lime, cement kiln dust, or lime kiln dust. In U.S. Pat. No. 5,275,733, the usable alkaline materials were expanded to include gypsum, fluidized bed ash, lime injected multistage burner ash, dry sulfur scrubbing residue, slag fines, pulverized calcium carbonate, Class C or Class F fly ash, or a combination thereof.

Some processes have utilized the concept of raising the pH in combination with high heat, e.g., greater than 70° C., to nearly sterilize as contrasted to pasteurizing the sludge, thereby killing nearly all of the bacteria both undesirable and desirable. With these "add-on" processes, usually the principal surviving microorganisms are bacterial spores. However, such microbially restricted sludges lose the significant fertility value associated with bioactivity.

When alkaline materials are added to municipal sludges in sufficient mass to raise the pH to at least 11 and to over 12, toxic stresses occur that may affect the disposition of the treated sludge material (EPA 600/2-78-171). For example, the high pH itself may preclude the product use in certain agricultural settings; in addition, the high pH triggers the release of volatile ammonia which itself is toxic and, of course, represents the loss of valuable nitrogen from the potential agricultural product.

The processes of U.S. Pat. Nos. 4,781,842 and 4,902,431 require a drying period which may be effected by, e.g., a windrowing process and results in a product that is above pH 12 and, if produced from an anaerobically digested sludge, emits significant amounts of ammonia. The processes substantially reduce the emission of ammonia by aeration (such as windrowing), but to do so the processes take 3 to 10 days to prepare the product for storage or market. Other alkaline treatment processes, such as in U.S. Pat. No. 5,013,458, using high amounts of CaO and heat above 70° C. for 30 minutes, have been approved by the EPA and have been utilized as the basis for constructing a formula for predicting pasteurization based upon time of incubation at a certain temperature. Such formula is published as part of 40 CFR 503.

In U.S. Pat. Nos. 4,781,842 and 4,902,431, Nicholson and Burnham teach the significant advantages of adding accelerated drying by aeration to alkaline treated sludges to achieve odor reduction and control. When windrows are used, this Nicholson and Burnham process commonly takes between 3 and 10 days to effect the aeration/drying.

U.S. Pat. Nos. 5,275,733 and 5,417,861 provide a faster method of accomplishing the aeration/drying. These patents recognize that an ecologically active population of microflora is critically significant to long-term sludge stability because of its ability: a) to enhance by its own metabolism the carbonation of any residual hydroxides or likewise the catabolism of unstable organics; b) to reduce sludge odors and produce a soil-like odor; and c) to prevent the regrowth of pathogenic microorganisms. These processes thereby avoid excess killing of the microflora.

In addition to wastewater and sewage sludge, another type of sludge called bioorganic sludge presently causes a variety of problems to society with regard to proper disposal or use. These sludges include organic sludges comprised of a material or materials such as, e.g., sludges resulting from production of antimicrobials and other pharmaceutical products, bacterial fermentation sludges, sludges resulting from production of beer and wine, mushroom compost waste, paper mill sludges, sludges that contain microorganisms that have resulted from recycled organic products such as paper products; sludges resulting from the growth of microorganisms for the production of chemicals and organics, industrial sludges and byproducts resulting from the production of microbial products and foodstuffs, and sludges resulting from the animal slaughter industry—particularly if these are digested or otherwise broken down by microorganisms.

Another problematic type of sludge includes organic sludge which is derived from industrial products and byproducts that are comprised in the majority by microbially degradable organic materials not of biological or microbiological origin. These organic sludges might include recycled organic products such as recycled paper and paper products.

The treatment of bioorganic and organic sludges is needed for two reasons. First, bioorganic sludges usually provide an excellent substrate for anaerobic bacterial metabolism, resulting in the creation of noxious odors and community problems. Second, bioorganic and organic sludges without stabilization create runoff problems with non-point source discharge pollution. Accordingly, stabilization may delay entry of nitrogen from the sludges into the ground water both avoiding contamination and allowing longer access for crops to the nitrogen in a stabilized sludge product.

In U.S. Pat. No. 5,853,590, a process is disclosed that performs an alkaline stabilization process for treating bioorganic and organic sludges, in addition to wastewater and sewage sludges. The sludges as biosolid cakes (13–35% solids) are mixed with a combination of lime and mineral by-products (such as lime kiln dust, cement kiln dust, and various coal combustion by-products such as fly ash or flue gas desulfurization by-products) to raise pH to 12 or higher, raise initial solids in the range of about 40%, and generate heat by the exothermic reaction of free lime (CaO) with water in the biosolids. The initial mixture is then introduced into a direct rotary drum dryer and dried to about 65% solids. After discharge from the dryer, the dried material is held in a heat pulse bin for 12 hours at a temperature of 52° C. or higher. The pH of the material is then tested after 72 hours to determine that it is pH 12 or higher.

Concerns with this process include the cost of the alkaline and mineral by-product materials, less material reduction by drying compared to straight biosolids drying, and inflexibility in product characteristics.

Accordingly, there is a need in the art for a method and system for treating and stabilizing bioorganic, organic, wastewater, and/or sewage sludges in such a way as to solve the problems of previous treatment methods, thereby providing a beneficiated soil or fertilizer from the treated sludge product.

SUMMARY OF THE INVENTION

In one embodiment, the present invention is directed to a method of producing a treated sludge product comprising (a) forming a sludge mixture by mixing untreated sludge with at least one alkaline material in an amount sufficient to raise pH of the sludge mixture to a level of at least about 12 and to increase percent solids in the sludge mixture to at least about 40% by weight; (b) forming a dried sludge mixture by drying the sludge mixture from step (a) in a direct or indirect dryer thereby increasing the percent solids thereof to at least about 50% by weight; (c) recycling a portion of the dried sludge mixture from step (b) to step (a); and (d) pasteurizing the dried sludge mixture from step (b) at a temperature at or above about 52° C. to form a treated sludge product.

In another embodiment, the present invention provides a system for producing a treated sludge product comprising (a) a mixer for mixing untreated sludge with at least one alkaline material to form a sludge mixture; (b) a dryer for drying the sludge mixture to form a dried sludge mixture; (c) a recycle feed to said mixer, said recycle feed comprising a portion of the dried sludge mixture from the dryer; and (d) holding means for receiving and pasteurizing the dried sludge mixture from the dryer to produce a treated sludge product.

Recycling a portion of the dried sludge mixture from the dryer may advantageously decrease the amount of expensive alkaline material used to treat the sludge, thereby reducing the total amount of product handled by the system. Recycling may also provide supplemental heat to the sludge, thereby reducing the amount of energy needed for subsequent drying and/or pasteurization steps. Advantageously, the amount of dried sludge mixture recycled may be controlled by an automatic controller, which may function in response to a detected condition of the final treated sludge product.

DETAILED DESCRIPTION

Figure 1:
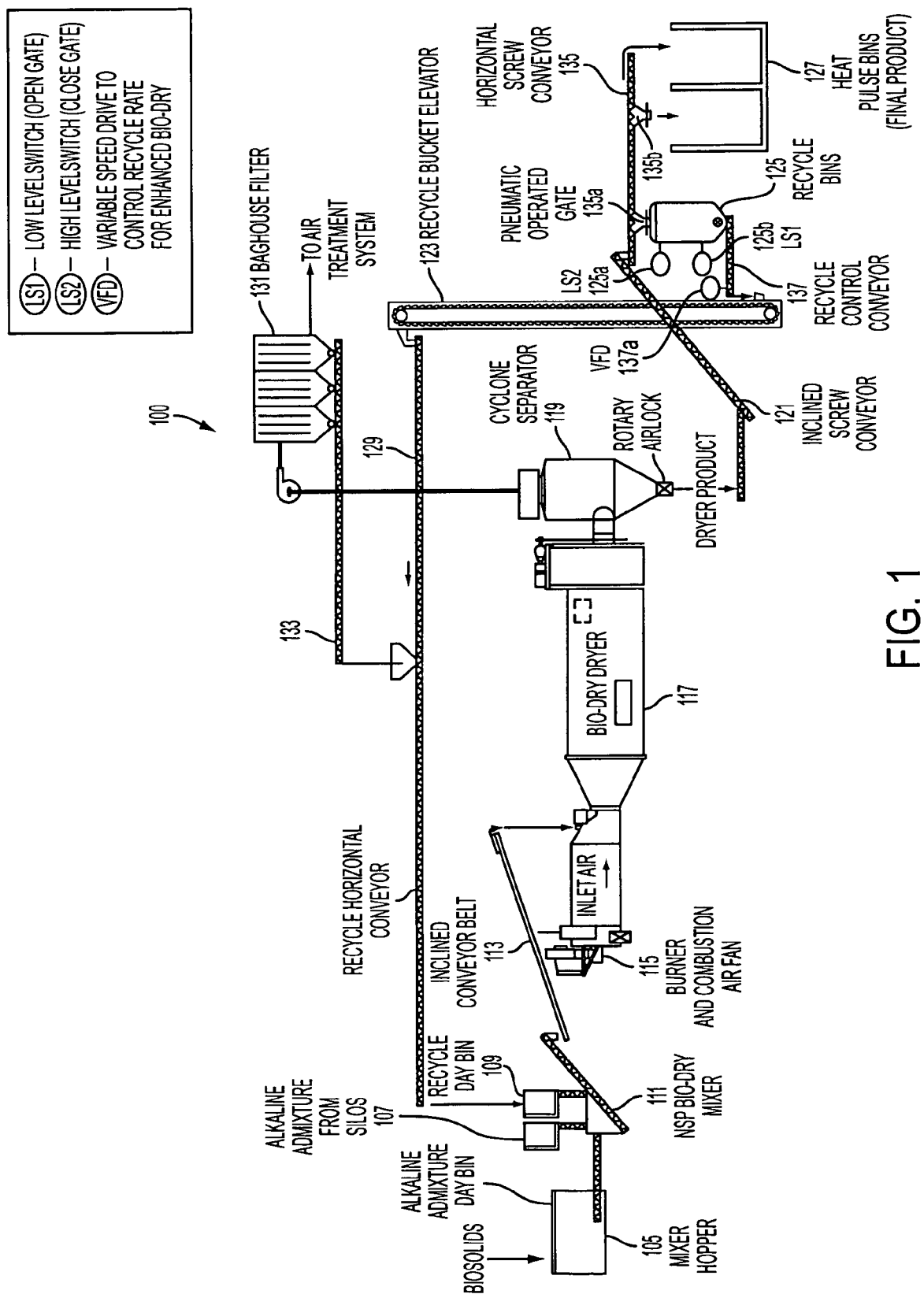
FIG. 1 shows an overall schematic for the process in accordance with the present invention described herein.

Embodiments of this invention relate to a method and system for using recycled dried sludge mixture to treat bioorganic, organic, wastewater and/or sewage sludge. The method and system may be designed to detoxify, stabilize and beneficiate the sludge by reducing its pathogen levels so that the treated sludge product can be safely used as a soil addition or applied as a fertilizer in agriculture, for example. The use of recycle may advantageously reduce the amount of alkaline material to be mixed with the untreated sludge and, hence, the amount of final treated sludge product made, more effectively capture sludge particulates from the system exhaust gas stream, reduce the amount of energy needed to dry and/or pasteurize the sludge mixture, and increase the flexibility in final treated sludge product characteristics.

FIG. 1 shows an overall system schematic for reducing the pathogen levels in bioorganic, organic, wastewater, and/or sewage sludge according to embodiments of the present invention. The system may receive sludge and treat it to reduce pathogens to an acceptable level, for example, to comply with EPA Class A sludge requirements. The system may recycle a controllable amount of dried sludge mixture as advantageously described.

In the system, a mixer hopper 105, an alkaline material bin 107, and a recycle day bin 109 may feed their contents into a bio-dry mixer 111, which mixes the contents together to produce a sludge mixture. The mixer hopper 105 may contain the untreated sludge. The alkaline material bin 107 may contain an alkaline material. The recycle day bin 109 may contain the recycled dried sludge mixture. In the mixer 111, the alkaline material and the recycled dried sludge mixture may exothermically react with the water in the untreated sludge to heat the sludge mixture. Additionally, the recycled dried sludge mixture may contain residual heat that supplements the exothermically generated heat.

A bio-dry dryer 117 may receive the heated sludge mixture from the bio-dry mixer 111 via an inclined conveyor belt 113. The dryer 117 may further heat the sludge mixture to dry it and increase the percent solids content to about 50% w/w or higher, preferably greater than 65% w/w. A dryer according to the present invention may include one or more direct dryers or indirect dryers. Direct dryers may bring heated air into direct contact with the sludge mixture. Indirect dryers may heat metal or other material surfaces that come in contact with the sludge mixture. For example, steam or hot water or other heated gaseous or liquid substances may be used to heat the metal surfaces. Heat may be transferred to the sludge mixture upon contact with the heated metal surface.

Non-limiting examples of suitable dryers according to the present invention include direct concurrent flow dryers, direct rotary dryers, concurrent forced air rotary dryers, horizontal single, double and triple pass indirect dryers, and vertical counter flow rotating disk indirect dryers.

Exemplary direct rotary dryers are disclosed, e.g., in U.S. Pat. No. 5,525,239, incorporated by reference herein in its entirety. In such a rotary dryer, a burner and combustion air fan 115 coupled to the dryer 117 may introduce heated air into the dryer 117 to dry the sludge mixture.

In embodiments of the invention where a direct dryer is used to dry the sludge mixture as in FIG. 1, a cyclone separator 119 may receive the dried sludge mixture from the bio-dry dryer 117 and separate the mixture from the heated air. The dried sludge mixture may exit the bottom of the separator 119 and the heated air and sludge particulates may exit the top. It is to be understood that such a separator is not necessary where the dryer is an indirect dryer or there is otherwise no need to separate dried sludge particulates or fines from the bulk mixture comprising larger dried sludge particles or agglomerates.

An inclined screw conveyor 121 may transport the dried sludge mixture from the bottom of the separator 119 to a horizontal screw conveyor 135. A recycle bin 125 may receive some of the dried sludge mixture through a first pneumatic operated gate 135a on the horizontal screw conveyor 135. Heat pulse bins 127 may receive the remaining dried sludge mixture through a second pneumatic operated gate 135b and/or from the end of the horizontal conveyor 135. Each pulse bin 127 generally may hold one full day's production.

High and low level switches 125a, 125b on the recycle bin 125 may control the dried sludge mixture level in the recycle bin 125 by opening and closing the first gate 135a. The low level switch 125b may open the first gate 135a, diverting dried sludge mixture to the recycle bin 125 when the bin level is low. The high level switch 125a may close the first gate 135a, sending the dried sludge mixture to the heat pulse bins 127 as a final product.

A sensor (not shown) may detect a condition of the treated sludge product in the heat pulse bins 127. Such condition may include, e.g., any one or more of BTU content (a measure of the amount of combustible organic materials present in the sludge), alkalinity, nutrient and trace nutrient levels. An automatic controller (not shown) may control the amount of dried sludge mixture recycled to the recycle day bin 109 and/or fed into the mixer 111 in response to the condition detected by the sensor. Exemplary automatic controllers include a programmable logic controller, a SCADA computer controller, or any such controller that automatically monitors and controls the recycle. Alternatively, a controller may allow an operator to monitor and control the recycle. Conventional control methods may be employed to control the recycle and the entire system.

A recycle control conveyor 137 may transport the dried sludge mixture from the recycle bin 125 to a recycle bucket elevator 123. A variable speed drive 137a on the recycle control conveyor 137 may adjust the recycle rate in response to a signal from the automatic controller. The recycle bucket elevator 123 may lift the dried sludge mixture to a recycle horizontal conveyor 129, which transports the recycled dried sludge mixture to the recycle day bin 109.

A venturi scrubber and baghouse filter 131 may receive the heated air and sludge particulates from the top of the cyclone separator 119. The scrubber/filter 131 may be specifically designed for the high temperature and high alkaline content of the particulates. The particulates may be captured on the scrubber/filter 131, then dislodged using pulse jet cleaning, and collected on a baghouse horizontal screw conveyor 133 that may transport and then drop the particulates onto the recycle conveyor 129 to combine with the dried mixture to form the recycled dried sludge mixture. The recycle day bin 109 may receive the recycled dried sludge mixture for later mixing with incoming untreated sludge in the bio-dry mixer 111.

By recycling some of the dried sludge mixture, the system may substitute the recycled mixture for some of the alkaline material, thereby lowering the purchase costs of the alkaline material. This may result in reduced amounts of total volume in the system. Hence, recycling may result in less final product to handle and ultimately discharge. Embodiments of the present invention may also provide a more effective capture of particulates by using the venturi scrubber and baghouse filter 131 to collect the particulates and recycle them through the system, rather than discharge them with the exhaust gas stream. The amount of particulates or fines recycled from the baghouse filter can also be automatically controlled in response to a detected condition of the treated sludge product as described hereinabove.

After exiting the dryer 117, the dried sludge mixture may retain some residual heat, which may be returned to the system in the recycled dried sludge mixture. The heated recycled sludge mixture may be mixed with the untreated sludge, thereby providing supplemental heat to the sludge mixture, in addition to the heat provided from the previously described exothermic reaction. The heated sludge mixture may then enter the dryer 117 at a higher temperature. Hence, the burner and combustion air fan 115 need not consume as much energy in order to heat and dry the sludge mixture, thereby saving fuel and energy costs. Similarly, residual heat in the recycled particulates or fines from the baghouse filter may reduce overall energy consumption.

By controlling the amount of recycle, the system may advantageously customize the final product characteristics to whatever is desired according to local markets or local constraints. For example, if the local market for the treated sludge product is as fuel, the amount of recycle may be optimized such that the final product has enhanced BTU value (i.e., a higher organic material content) while still retaining ignitibility control of mineral components, which may be present in the recycle product and the alkaline material. Alternatively, if the local market for the treated sludge product is as soil additions, e.g., calcareous soils or topsoil blends, the amount of recycle may be optimized to produce higher organic and nutrient matter content or a desired alkalinity.

The untreated sludge may comprise raw, digested, secondary or combined wastewater sludge, sewage sludge, bioorganic sludge, organic sludge, or a mixture of such sludges. Indeed, any type of sludge, safe upon suitable treatment, for application to land may be treated in accordance with the present invention. Sludge not intended to be applied to land may also be treated in accordance with the present invention. Such sludges may contain, for example, toxic or hazardous materials that, while unsafe for land application, may be beneficially disposed of by, e.g., incineration. Such sludges treated in accordance with the present invention may be incinerated to recover their fuel value.

The alkaline material may comprise cement kiln dust, lime kiln dust, gypsum, fluidized bed ash, lime injected multistage burner ash, dry sulfur scrubbing residue, slag fines, pulverized calcium carbonate, Class C or Class F fly ash and other coal combustion by-products, or any like material capable of binding odorant organics and inorganics from the sludge and raising the pH of the sludge in order to commence pasteurization, including ammonia production and heat generation.

According to embodiments of the present invention, the method for producing the treated sludge product so that it may be safely used as soil or crop fertilizer, for example, includes mixing the untreated sludge with an amount of an adsorbent alkaline material to form a sludge mixture, drying the sludge mixture to form a dried sludge mixture, recycling a portion of the dried sludge mixture to mix with untreated sludge and alkaline material, and pasteurizing the remaining dried sludge mixture to form the treated sludge product.

Recycling may include detecting a condition of the treated sludge product in the heat pulse bins 127, diverting some of the dried sludge mixture exiting the dryer 117 into the recycle bin 125 rather than the pulse bins 127, conveying an automatically controlled amount of the recycled mixture via conveyor 137, elevator 123, and conveyor 129 to recycle day bin 109 based on the detected condition, capturing particulate amounts of the dried sludge mixture from an exhaust gas stream in the venturi scrubber and baghouse filter 131, conveying by the baghouse conveyor 133 the captured particulates to the recycle conveyor 129, dropping the captured particulates into the recycled dried sludge mixture, and mixing a controlled amount of the recycled dried sludge mixture from bin 109 with untreated sludge and alkaline material in the mixer 111 based on the detected condition.

The recycled dried sludge mixture may include appreciable amounts of alkaline material, which may substitute for fresh alkaline material from bin 107, thereby reducing the costly amounts of costly fresh alkaline material used and, consequently, the total volume of sludge mixture in the system. The recycled dried sludge mixture may have a temperature comparable to that of the exit temperature from the dryer 117. Accordingly, when mixed with the untreated sludge and alkaline material, the recycled dried sludge mixture may provide supplemental heat to the sludge mixture entering the dryer 117, such that the burner and fan 115 to the dryer 117 expend less energy.

Alternatively as discussed above, for an indirect dryer, the scrubber/filter 131 need not be used since there is no exhaust gas stream, hence, no particulates to be captured.

Mixing may include combining the untreated sludge with the alkaline material in order to adjust the pH of the sludge mixture to at least pH 12.0, raise the percent solids of the mixture to at least about 40% by weight, thereby reducing the sludge odor, improving the heat transfer efficiency of the sludge mixture drying process, and accelerating the achievement of mixture granularity.

Drying may be done by a direct dryer to include heating inlet air to the dryer 117 with the burner and fan 115 and aerating and drying the sludge mixture in the dryer 117 until the percent solids of the mixture reaches at least about 50% or more, preferably about 65% w/w or greater, for example. Alternatively, drying may be done by an indirect dryer to include heating a metal or other material surface and transferring the heat through the surface to the sludge mixture to aerate and dry the sludge mixture until the percent solids of the mixture reaches at least about 50% or more, for example.

Pasteurization may include subjecting the treated sludge product to heat in the heat pulse bins 127. Heating may include holding the treated sludge product at a particular temperature for a defined period of time before releasing the treated sludge as product. The temperature and the time period may be defined by the EPA requirements for Class A sludges, as described in 40 CFR 503, the contents of which are incorporated herein by reference. In general, the higher the temperature maintained by the treated sludge, the shorter the time the treated sludge need be incubated in the pulse bins 127. In some embodiments, the temperature of the treated sludge in the pulse bins 127 may be maintained from 52° C. for 12 hours to 70° C. for 30 minutes to 100° C. for a few seconds, for example, or to any conditions sufficient to reduce pathogens in the untreated sludge to Class A or B standards.

The resultant bioactive product of this invention may be useful as a soil substitute, conditioner, or topsoil blend ingredient, a fertilizer, a fuel, or an agricultural liming agent, for example. A key objective of this invention is to recycle a portion of treated sludge back into the system to enhance the performance and cost efficiency of the system.

The above is a detailed discussion of the preferred embodiments of the invention. The full scope of the invention to which applicants are entitled is defined by the claims hereinafter. It is intended that the scope of the claims may cover other embodiments than those described above and their equivalents.

The invention claimed is:

1. A method of producing a treated sludge product comprising:
   (a) forming a sludge mixture by mixing untreated sludge with at least one alkaline material in an amount sufficient to raise pH of the sludge mixture to a level of at least about 12 and to increase percent solids in the sludge mixture to at least about 40% by weight;
   (b) forming a dried sludge mixture by drying the sludge mixture from step (a) in a direct or indirect dryer thereby increasing the percent solids thereof to at least about 50% by weight;
   (c) recycling a portion of the dried sludge mixture from step (b) to step (a); and
   (d) pasteurizing the dried sludge mixture from step (b) at a temperature at or above about 52° C. to form a treated sludge product.

2. The method of claim 1, wherein said drying is conducted by direct drying.

3. The method of claim 2, wherein said direct drying comprises contacting said sludge mixture with heated air in a rotary drum dryer.

4. The method of claim 3, further comprising collecting particulates from an exhaust gas stream of said rotary drum dryer and recycling said particulates to step (a).

5. The method of claim 4, wherein said particulates are collected in a combination venturi scrubber and baghouse filter.

6. The method of claim 1, wherein said pasteurizing comprises:
   maintaining the dried sludge mixture at a temperature of from about 52° C. to about 100° C. for a period of time sufficient to reduce the density of fecal coliform in the sewage sludge to less than 1000 most probable number per gram of total dry weight solids or to reduce the density of *Salmonella* sp. bacteria to less than 3 most probable number per gram of total dry weight solids.

7. The method of claim 1, wherein the portion of said dried sludge mixture recycled from step (b) to step (a) is automatically controlled.

8. The method of claim 7, wherein the portion of said dried sludge mixture recycled from step (b) to step (a) is automatically controlled in response to a detected condition of said treated sludge product.

9. The method of claim 8, wherein said detected condition comprises at least one of BTU content, alkalinity, nutrient and trace nutrient levels.

* * * * *